(12) United States Patent
Rosenberg et al.

(10) Patent No.: US 6,418,416 B1
(45) Date of Patent: Jul. 9, 2002

(54) INVENTORY MANAGEMENT SYSTEM AND METHOD

(75) Inventors: Dean G. Rosenberg; William K. Holmes, both of San Diego, CA (US)

(73) Assignee: SupplyPro, Inc., San Diego, CA (US)

( * ) Notice: Subject to any disclaimer, the term of this patent is extended or adjusted under 35 U.S.C. 154(b) by 0 days.

(21) Appl. No.: 09/476,536

(22) Filed: Jan. 3, 2000

Related U.S. Application Data

(60) Provisional application No. 60/127,567, filed on Apr. 2, 1999.

(51) Int. Cl.[7] ............................................. G06F 153/00

(52) U.S. Cl. ......................................... 705/28; 705/22

(58) Field of Search ............................. 705/28, 29, 23, 705/22, 26; 221/10, 12, 28; 312/215; 707/3, 9

(56) References Cited

U.S. PATENT DOCUMENTS

| | | | |
|---|---|---|---|
| 4,717,042 A | 1/1988 | McLaughlin | |
| 4,785,969 A | 11/1988 | McLaughlin | |
| 4,893,727 A | 1/1990 | Near | |
| 4,896,024 A | 1/1990 | Morello et al. | |
| 4,953,745 A | 9/1990 | Rowlett, Jr. | |
| 4,967,906 A | 11/1990 | Morello et al. | |
| 5,014,875 A | 5/1991 | McLaughlin et al. | |
| 5,047,948 A | * 9/1991 | Turner | 364/479.07 |
| 5,067,630 A | 11/1991 | Nesser et al. | |
| 5,084,828 A | 1/1992 | Kaufman et al. | |
| 5,126,957 A | 6/1992 | Kaufman et al. | |
| 5,190,185 A | 3/1993 | Blechl | |
| 5,242,464 A | 9/1993 | Armstrong et al. | |
| 5,263,596 A | 11/1993 | Williams | |
| 5,267,174 A | 11/1993 | Kaufman | |
| 5,314,243 A | * 5/1994 | McDonald et al. | 312/215 |
| 5,329,459 A | 7/1994 | Kaufman et al. | |
| 5,337,253 A | 8/1994 | Berkovsky et al. | |
| 5,346,297 A | 9/1994 | Colson, Jr. et al. | |
| 5,377,864 A | 1/1995 | Blechl et al. | |
| 5,392,951 A | 2/1995 | Gardner et al. | |
| 5,431,299 A | 7/1995 | Brewer et al. | |
| 5,434,775 A | * 7/1995 | Sims et al. | 705/8 |
| 5,445,294 A | 8/1995 | Gardner et al. | |
| 5,460,294 A | 10/1995 | Williams | |
| 5,520,450 A | 5/1996 | Colson, Jr. et al. | |
| 5,564,803 A | * 10/1996 | McDonald et al. | 312/215 |
| 5,661,978 A | 9/1997 | Holmes et al. | |
| 5,713,485 A | 2/1998 | Liff et al. | |

(List continued on next page.)

FOREIGN PATENT DOCUMENTS

| | | | | |
|---|---|---|---|---|
| JP | | 59-194907 | * 11/1984 | 705/28 |
| WO | PCT/AU98/00616 | | 8/1998 | |

OTHER PUBLICATIONS

"Buyers Looking to reduce suppliers" from The Gale Group Trade & Industry DB, May 3, 2001.*

*Primary Examiner*—Douglas Hess
(74) *Attorney, Agent, or Firm*—Michael Best & Friedrich LLP

(57) ABSTRACT

A method and system of dispensing items in a controlled manner from cabinets or similar enclosures, re-ordering the dispensed articles or items, and providing inventory and other information about the items and users in the system. The invention utilizes a distributed network and permits users to browse and search for any item across multiple enclosures from any location. The method and system can track inventory, generate administrative reports, and independently initiate orders based on aggregate inventory levels of multiple enclosures to gain the benefit of volume discounts, minimize deliveries, maximize availability of items, or generate individual orders based on specific enclosures to maintain just-in-time inventory levels. The method and system also track the removal and stocking of items through unique identification strings, so that individual access, use, and theft of items can be monitored.

32 Claims, 17 Drawing Sheets

U.S. PATENT DOCUMENTS

| | | |
|---|---|---|
| 5,716,114 A | 2/1998 | Holmes et al. |
| 5,745,366 A | 4/1998 | Higham et al. |
| 5,769,269 A | 6/1998 | Peters |
| 5,797,515 A | 8/1998 | Liff et al. |
| 5,801,628 A | 9/1998 | Maloney |
| 5,805,455 A | 9/1998 | Lipps |
| 5,805,456 A | 9/1998 | Higham et al. |
| 5,832,459 A * | 11/1998 | Cameron et al. ............. 705/26 |
| 5,842,976 A | 12/1998 | Williamson |
| 5,883,806 A | 3/1999 | Meador et al. |
| 5,905,653 A | 5/1999 | Higham et al. |
| 5,927,540 A | 7/1999 | Godlewski |
| 5,940,306 A | 8/1999 | Gardner et al. |
| 5,953,706 A * | 9/1999 | Patel ............................ 705/6 |
| 5,963,919 A * | 10/1999 | Brinkley et al. ............. 705/28 |
| 5,971,273 A | 10/1999 | Vallaire |
| 5,983,200 A * | 11/1999 | Slotznick .................... 705/26 |
| 5,983,202 A * | 11/1999 | Yabe et al. ................... 705/28 |
| 5,997,928 A | 12/1999 | Kaish et al. |
| 6,003,006 A | 12/1999 | Colella et al. |
| 6,011,999 A | 1/2000 | Holmes |
| 6,012,041 A * | 1/2000 | Brewer et al. ................ 705/28 |
| 6,021,392 A | 2/2000 | Lester et al. |
| 6,039,467 A | 3/2000 | Holmes |
| 6,065,819 A | 5/2000 | Holmes et al. |
| 6,068,156 A | 5/2000 | Liff et al. |
| 6,075,441 A | 6/2000 | Maloney |
| 6,108,588 A * | 8/2000 | McGrady .................... 700/231 |
| 6,148,291 A * | 11/2000 | Radican ....................... 705/28 |

\* cited by examiner

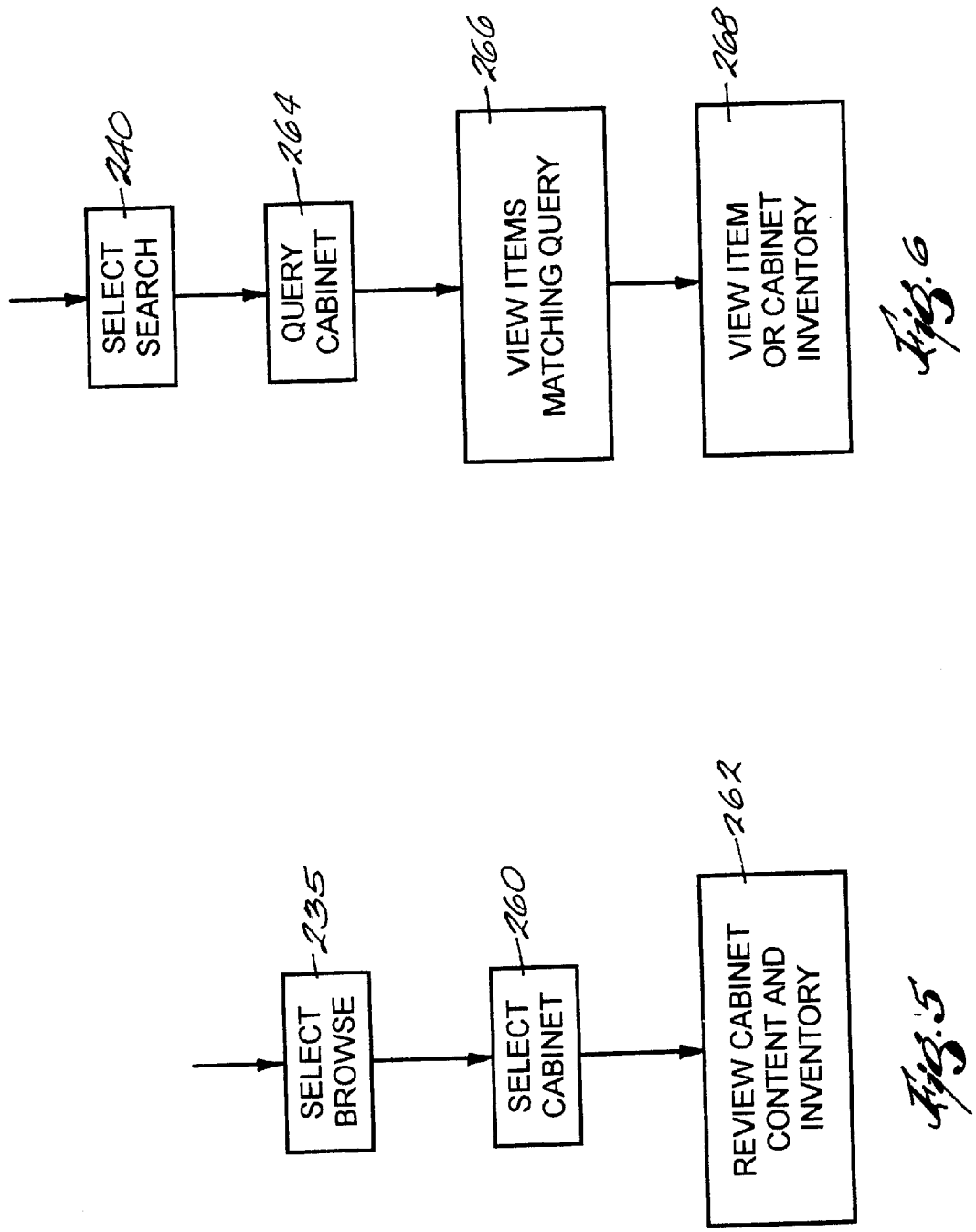

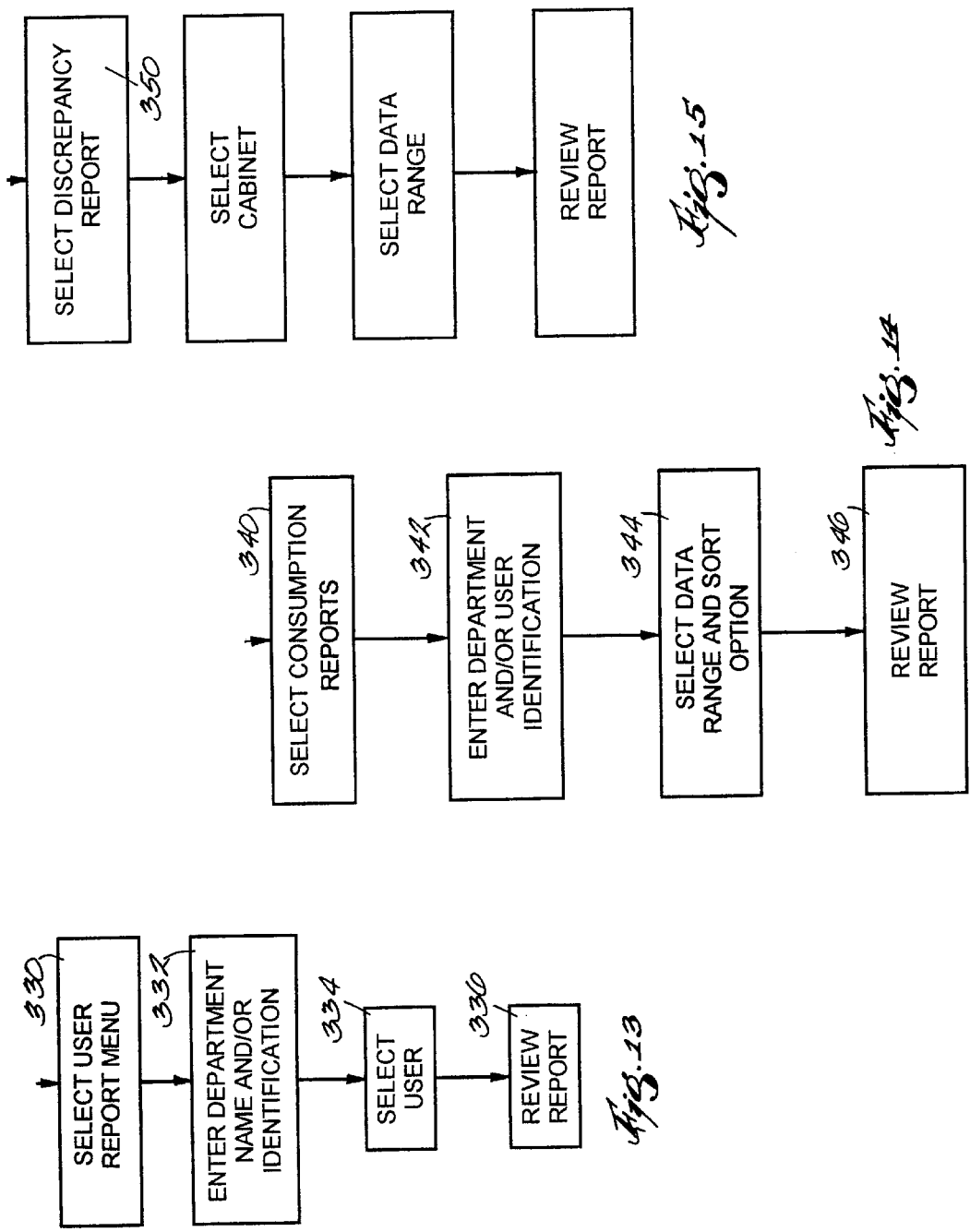

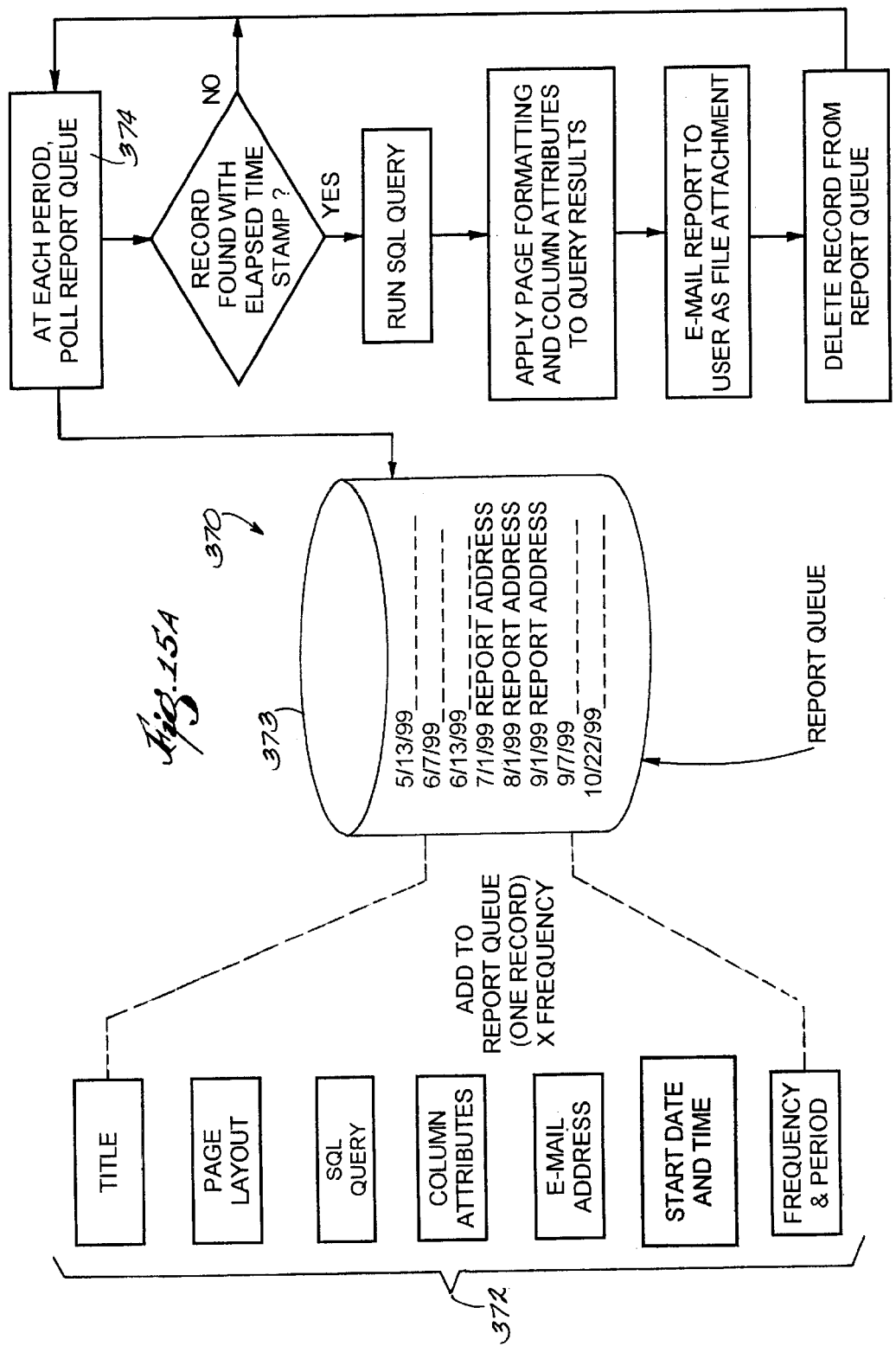

2

INVENTORY MANAGEMENT SYSTEM AND METHOD

CROSS-REFERENCE TO RELATED APPLICATIONS

This application claims priority under 35 U.S.C §119 to Provisional Patent Application Ser. No. 60/127,567, filed Apr. 2, 1999.

BACKGROUND OF THE INVENTION

1. Field of the Invention

The present invention relates to methods and systems for dispensing supplies and similar items in a controlled manner. More particularly, the present invention relates to a method and a system that provides distributed access to product and inventory information for supplies and that generates orders when supplies need to be re-ordered.

2. Background of the Invention

Distributed networks are characterized by a structure where processing, storing, and other functions are carried out by separate nodes rather than on a single main or centralized computer. The Internet is one example of a distributed network and, as is well known, it provides access to a wide array of information. The World Wide Web portion of the Internet provides a graphical, interactive medium that permits businesses to advertise and take orders for goods and services.

The variety of products and services available for sale through the Internet is tremendous. Some sites offer a full range of business supplies ranging from office furniture and computers to envelopes and pencils. However, these sites are often no more than electronic catalogs and some require separate computers, navigation software, and online addresses to shop online. Further, the typical electronic store does not assist users in selecting the right business supply inventory mix, track business supply use, or focus on users' needs to maximize efficiency and economic return. Further still, distributed networks such as the Internet have not, in general, been fully exploited as tools to facilitate the controlled dispensing, inventorying, and re-ordering of supplies. Yet, controlled stocking and dispensing of business supplies can prevent the occurrence of inventory shortages, overstocking (which can result in business inefficiency, increased storage costs, and waste), and pilferage.

SUMMARY OF THE INVENTION

The invention provides a method and a system for distributing articles, such as business supplies. The invention may be implemented in a system that includes at least one locked enclosure, an input device, a controller, and at least one portal site. A distributed network such as a public landline or a public wireless network interconnects the controller to the portal site and provides public network access between the controller, the portal site, homes, and remote offices.

In operation, a user accesses the system for distributing articles through an input device. The user enters an identification string that uniquely identifies the user and his or her access rights. The controller verifies the user's identification string and allows access to the enclosure when the user is authorized. The controller also obtains data through either the input device or other devices to track articles removed or added to the enclosure. Preferably, the data relates to the quantity of articles in the enclosure. After receiving the data, a connection via the distributed network or a direct modem connection is established between the portal site and the controller. The connection, which may occur on a periodic basis, allows for data and/or message exchanges.

In one preferred aspect, the system includes an identifying device, which preferably may be an audio or visual indicator. When a user selects an article, the audio or visual indicator is activated and identifies an article location.

In another preferred aspect, a connection is established between the portal site and at least one supplier. When the quantity of articles in the enclosure reaches a user-defined threshold or par value, the portal site automatically sends a message to one or more suppliers relating to the quantity of articles in the enclosure. The message may include one or more orders directing one or more suppliers to ship the desired articles to the user and may also instruct the suppliers to stock the enclosure.

In yet another preferred aspect, open access to the controller and the portal site may be provided to any authorized user from any location. Because the controller and the portal site may each have a unique address, the user can inquire as to the availability of a desired article from a remote location using a network browser. Moreover, a portal site can direct the user to one or more enclosures that have the desired article and authorize his or her access to that enclosure or that article when the method and system employ multiple enclosures. An alternative aspect envisions that the controller may also direct the user to one or more enclosures having a desired article and authorize his or her access and/or establish a direct or distributed network link with at least one supplier.

The disclosed method and system provide access to information and dispensing of articles in ways that are similar in ease-of-use to accessing the World Wide Web. The method and system allow users to browse and search for any article across multiple enclosures from any location. The method and system can track inventory, generate administrative reports, and independently initiate orders based on aggregate inventory levels of multiple enclosures to gain the benefit of volume discounts or generate individual orders based on specific enclosures to maintain just-in-time inventory levels. Moreover, because the method and system track the removal and stocking of articles through unique identification strings, individual access, use, and theft can also be monitored.

These features as well as other advantages of the invention will become apparent upon consideration of the following detailed description and accompanying drawings of the embodiments of the invention described below.

BRIEF DESCRIPTION OF THE DRAWINGS

In the drawings:

FIG. 5 is a flow chart showing the methodology used to review the content of a cabinet as implemented in a system made in accordance with the teachings of the present invention;

FIG. 6 is a flow chart showing the methodology used to search the contents of a cabinet as implemented in a system made in accordance with the teachings of the present invention;

FIG. 13 is a flow chart of the methodology used to prepare and view user reports in a system implemented in accordance with the teachings of the present invention;

FIG. 14 is a flow chart of the methodology used to create and review a consumption report in a system made in accordance with the teachings of the present invention;

FIG. 15 is a flow chart of the methodology used to create and review a discrepancy report in a system made in accordance with the teachings of the present invention;

FIG. 15A is a flow chart of the methodology used in automatically generating reports in a system in accordance with the teachings of the present invention;

FIG. 18B is a flow chart of another part of the process used to generate an order in a system made in accordance with the teachings of the present invention.

DETAILED DESCRIPTION OF THE PRESENTLY PREFERRED EMBODIMENTS

Figure 1:
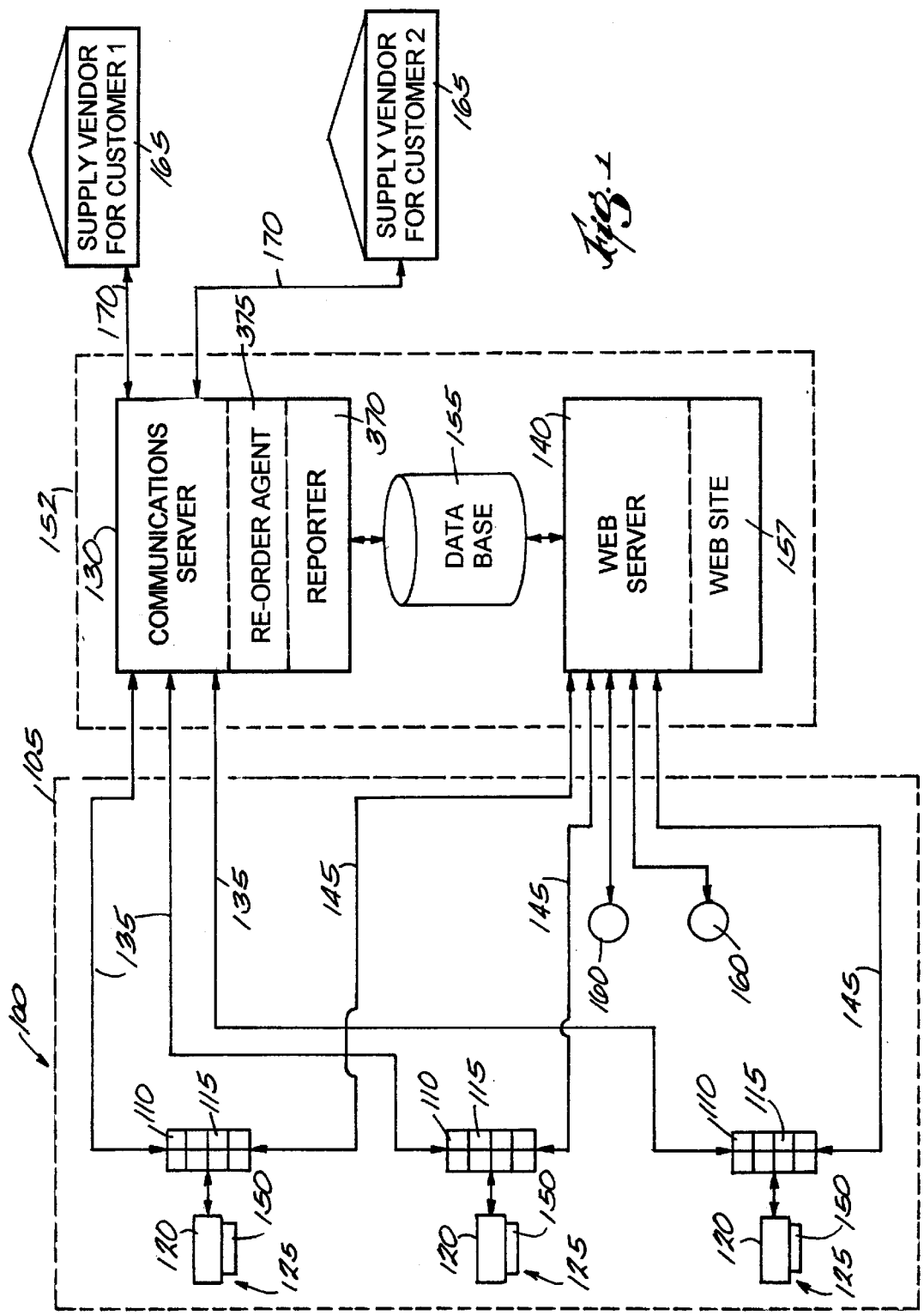
FIG. 1 is a block diagram of a first embodiment of the invention.

In the drawings the same reference numbers through several views designate alike and similar elements.

1. Top-Level Structure and Architecture

A system 100 embodying the invention is shown in FIG. 1. The system includes a customer site 105 having 3 cabinets 110, each with a number of pockets or compartments 115 that enclose and secure articles, such as business supplies or any other items that are preferably dispensed in a controlled manner. The compartments 115 may be slidably interconnected with the cabinet 110 in a drawer-like manner, if desired. Although it is preferred that the compartments 115 have clear acrylic doors to display articles, other types of doors may also be used. The compartments 115 are dimensioned to a variety of heights and widths to enclose and secure a variety of articles.

Electronically actuated locks (not shown) facilitate access to the articles enclosed within the cabinet 110. When in a locked state, the locks prevent the doors from being opened and prevent access to the articles. When actuated, the locks release the doors so that the articles are freely accessible. Preferably, the locks are actuated simultaneously to allow unrestricted access to the whole cabinet 110. The system 100, however, may also actuate locks independently and limit access to certain articles based on user access rights.

Input mechanisms, such as pressure sensitive switches (not shown), disposed near each drawer and compartment 115 of the cabinet 110 collect inventory information as articles are removed from or stocked within the cabinet 110. Preferably, the switches are "take" and "return" switches that are actuated each time an article is removed from or stocked within the cabinet 110. The cabinet 110 may also include an input device 120 such as a touch screen or a keyboard to track articles removed or added to the cabinet 110. The input device 120 may supplement or replace the switches.

Each cabinet 110 may also include devices that identify the location of a desired article. The devices preferably comprise visual (such as light emitting devices) or audio indicators that are actuated by the user. Such devices may be unitary with one or more of the switches, interconnected with the doors, or may be integrated with or enclosed by the compartments 115 of the cabinet 110.

With further reference to FIG. 1, a controller 125 (three are shown) is used to manage access to the cabinet 110, collect inventory and administrative data, and interface with other nodes that are accessible through its input device 120 or modem (not shown). The modem, which converts data from one form to another, interconnects the controller 125 to other nodes. The interconnections shown in FIG. 1 encompass both direct and indirect connections via a communication link. For example, with reference to FIG. 1, the modem may connect the controller 125 directly to a communications server 130 through landlines or wireless links 135 or may connect the controller 125 to a server 140 through peripheral networks and devices (not shown) that are linked to a distributed network 145 like the Internet. The term "distributed network," as used herein is intended to broadly encompass any network including public landline or a public wireless networks, in which processing, storage, and other functions are handled by separate nodes rather than a single controller or computer. As is known, one of the advantages of a distributed system is that functions are decentralized. Therefore, for example, high network traffic does not disrupt the function of the cabinet 110 or data collection that is carried out by the controller 125.

The controller 125 also includes a processor 150 and may include peripheral devices such as a display and/or a badge reader. The processor 150 controls access to the cabinet 110 and its articles and responds to user commands received through the modem or the input device 120. Preferably, the processor comprises a microprocessor-based system such as a PENTIUM™ based INTEL™ computer, for example, having static and dynamic memory that runs a known operating system such as WINDOWS™, LINUX™, or SOLARIS™, for example. The input device 120 is preferably a keyboard or a touch screen that allows users to make selections and enter information through a graphical display interface. The display may be a cathode-ray tube or a flat panel.

Although the system 100 is shown as having two servers 130 and 140, the functionality of the servers may be combined or distributed in a variety of ways. As shown in FIG.

1, a portal site 152 may be constructed to perform the functionality of the servers 130 and 140. Although not shown, the portal site 152 might include more than two servers.

Within the portal site 152 is at least one database 155 that stores information from the communications server 130 and the web server 140. The communications server 130 preferably can support concurrent communication through a direct modem connection or through the distributed network 145 with one or more of the controllers 125 and/or one or more supplier interfaces 165 (two are shown). The communications server 130 provides users with a variety of services, including tracking cabinet 110 activity, analyzing cabinet 110 inventory levels, updating the databases 155, transmitting reports to one or more nodes, modifying or updating operating and/or application software within the controllers 125 (adding new users, new products, or modifying access rights, for example), and automatically transmitting purchase orders through fax, electronic mail, or electronic data exchange links 170, or through the distributed network 145, for example. Although the purchase orders are preferably based on target inventory goals and user-defined thresholds or par values, purchase orders may also be transmitted to supplier interfaces 165 on a periodic basis regardless of monitored inventory levels. As user preferences change, it is also envisioned that the portal site 152 will provide additional services.

The one or more databases 155 are used to archive account information in relational tables. The information preferably includes user identification strings, user access rights, inventory records, controller and supplier addresses (Uniform Resource Locators, Domain Name Systems, or Internet Protocols, for example), telephone numbers, controller configuration data, application and operating software, and/or article catalogs. Workers of ordinary skill in the art will appreciate that additional administrative and inventory data can also be stored in the databases 155.

The web server 140 hosts an interactive web site 157 where users can interact with the servers 130 and 140 and the controllers 125 authorized by their user access rights. The web server 140 allows authorized users to browse cabinet inventory, search for articles, review authorized user lists, review inventory and supplier data, review article catalogs, modify article orders and par values, generate inventory reports, generate administrative reports, and generate other standard and customized reports. Because the web and communications servers 130 and 140 share some common databases, changes in these shared databases are accessible to authorized web users 160 (two are shown) and to the controller(s) 125. For example, if an authorized web user 160 connects to the web server 140 through a web browser, the authorized web user 160 may modify a par value that is then transmitted to one or more controllers 125. An authorized web user 160 from any location, thus, can configure and modify many parameters such as target inventory levels of one or more cabinets 110 using a web browser. The system 100 does not require application specific software or hardware.

Although user connections to the web server 140 are shown as direct links via the distributed network 145, connection may be made through commercial networks that provide telephone, satellite, radio, or microwave links, for example, to the distributed network 145.

The supplier interface 165 (two are shown) facilitates communication with vendors or suppliers for re-ordering of products. Preferably, the supplier interface 165 is a fax, an electronic controller, or a computer such as a server (which may support a separate portal site). The supplier interface 165 may allow authorized users to view information relating to the articles it distributes, conduct article searches, issue purchase orders, track purchase orders, track order history, and receive account information and invoices, for example.

Figure 2:
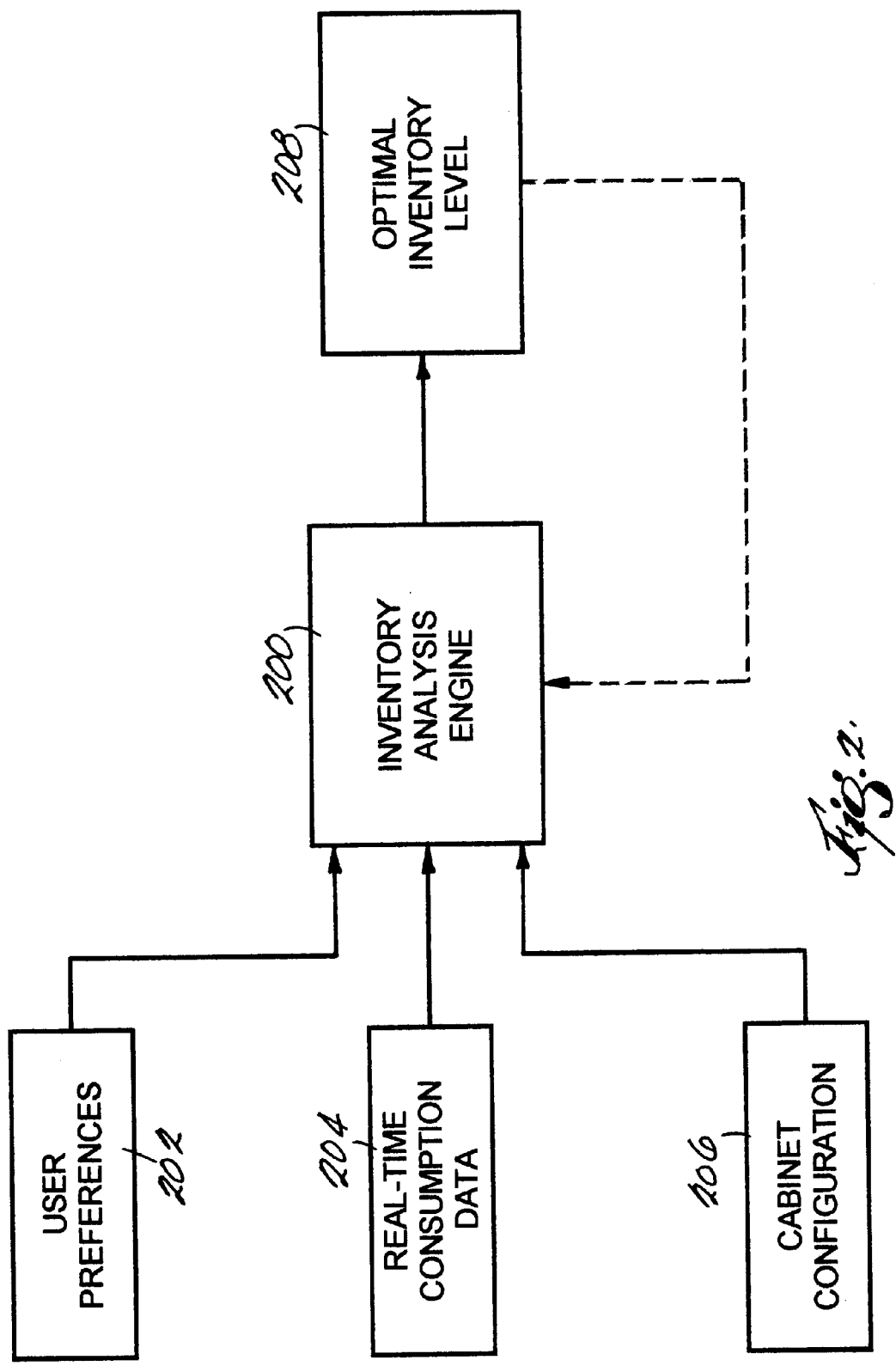
FIG. 2 is a block diagram of a dynamic inventory protocol of FIG. 1.

Automatic stocking and re-ordering are facilitated by implementing the protocol shown in FIG. 2. By way of example, the web server 140 may implement an inventory analysis engine 200 that receives user preference data 202, consumption data 204, and cabinet configuration data 206. In many instances, the user preference data 202 and cabinet configuration data 206 will be relatively static while consumption data 204 is likely to be dynamic, but any of the three could change. As will be discussed in greater detail below, the engine 200 generates an optimal inventory level 208, based on the consumption data 204, preference data 202, and cabinet configuration data 206. The optimal inventory level can be repeatedly calculated or adjusted to respond to changes in the user preference data, the consumption data, or cabinet configuration. Of course, if the inventory falls below a certain level, the communications server 130 issues or transmits an order to a supply vendor through the supplier interface 165 so that the products or articles in the cabinets 110 are timely replenished.

Figure 3:
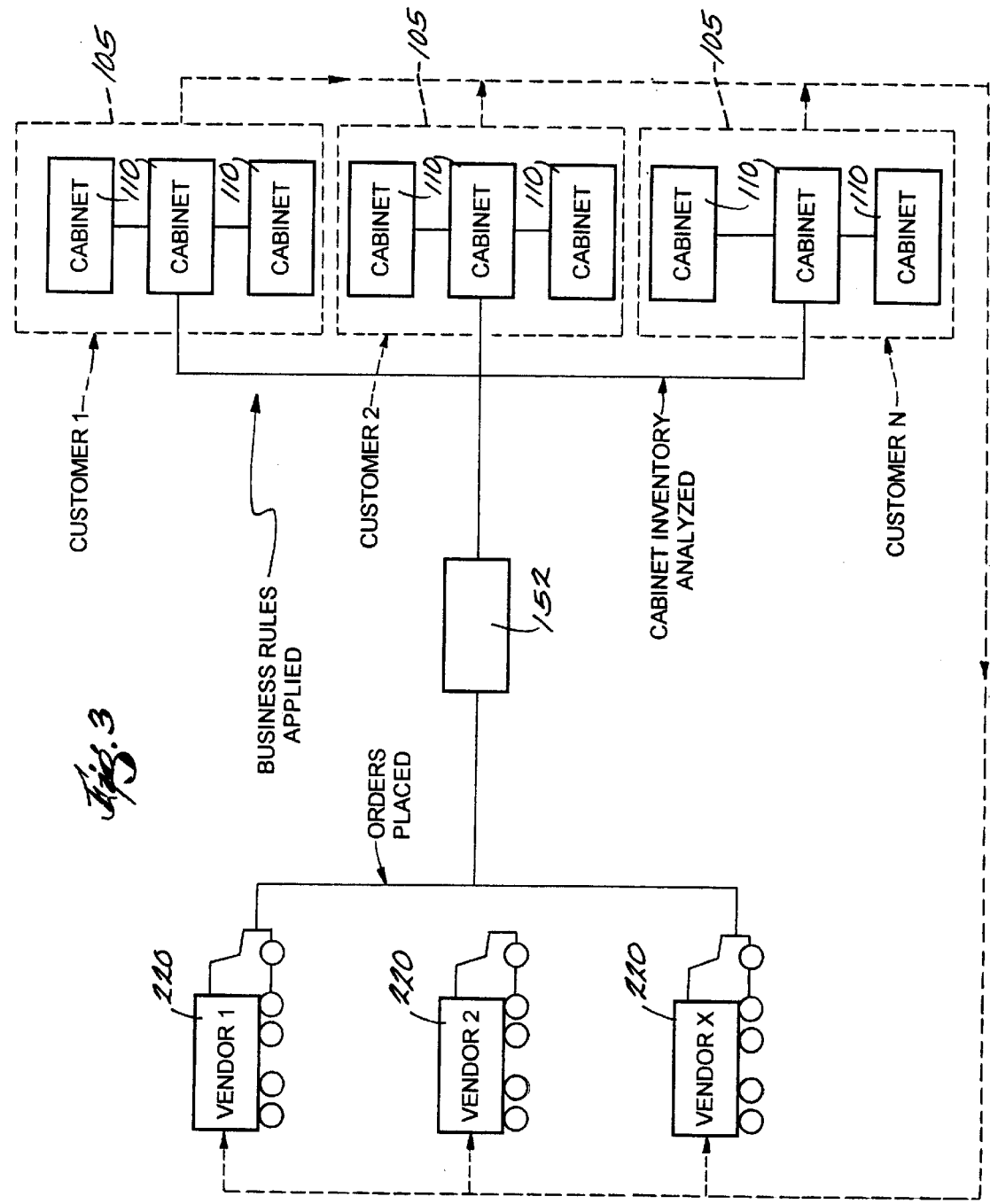
FIG. 3 is a schematic diagram of the system of the invention.

The overall process, expanded to include a number of customers 105, is shown in FIG. 3. A number of vendors 220 receive orders from the portal site 152 and supply customers with the necessary replenishment of the supplies required. Further details of the method and system are provided below.

2. Functional Description

Figure 4:
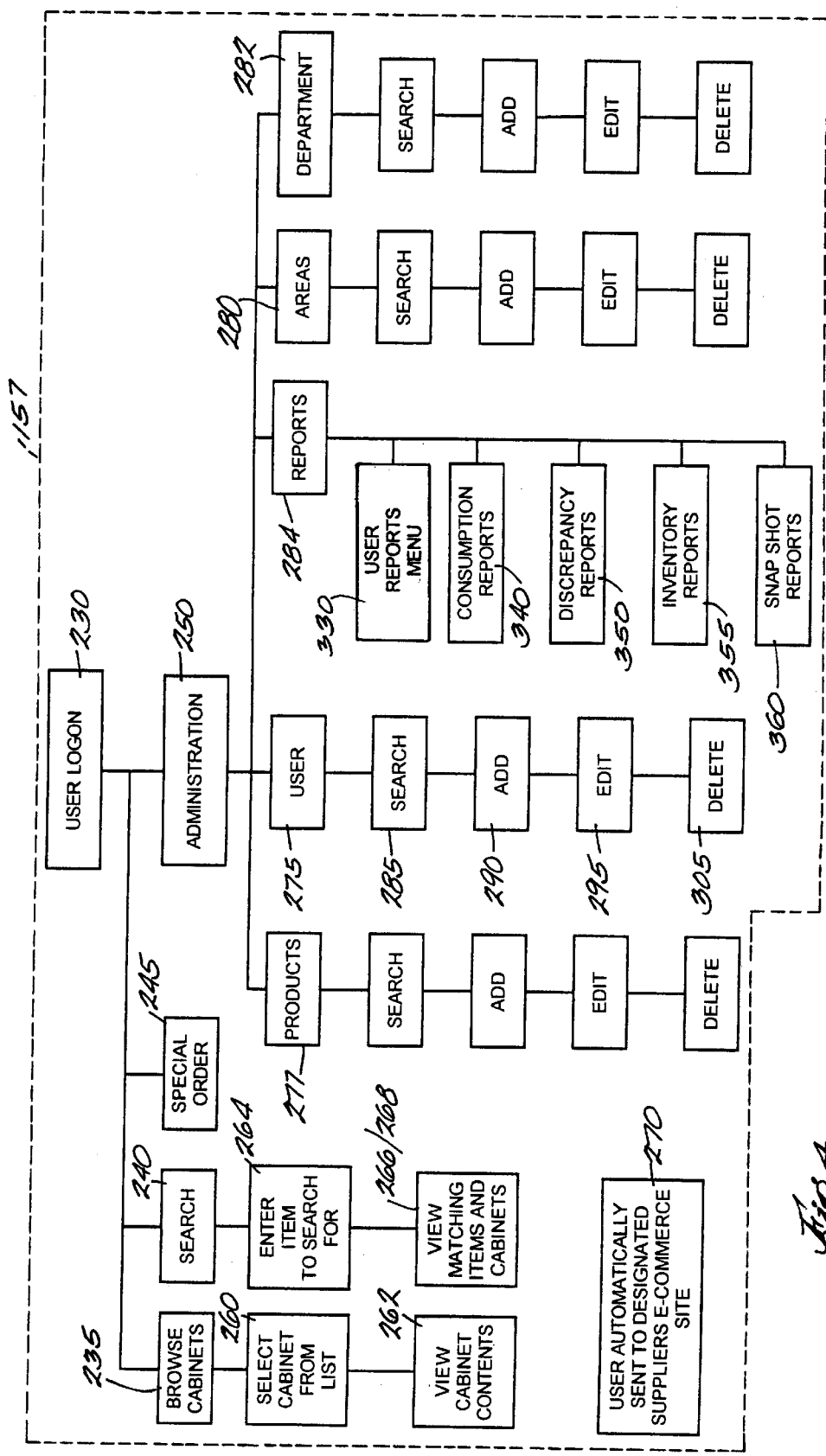
FIG. 4 is a functional block diagram of part of a portal site of FIG. 1.

FIG. 4 illustrates the functional hierarchy of the web site 157. A user may access the site using a browser installed on the controller 125 of the cabinet 110 or any other computer device connected to the distributed network 145. To access the web site 157 a user must first logon at 230 with a viable user ID and password. Once in the site, a user may select from several options: a browse cabinets option 235, a search option 240, a special order option 245, and an administration option 250.

As may be seen by reference to FIGS. 4 and 5, if the browse cabinets option 235 is selected, the site 157 permits the user to select at 260 one desired cabinet from those coupled to the portal site 152 and review at 262 the content and inventory of the cabinet. As best seen by reference to FIG. 6, if the search option 240 is selected, the user may enter a query in the form of a partial item name or description at 264 and then view items that match the query at 266, including current cabinet location and inventory. The user may then view detailed item descriptions of items in the cabinet or view cabinet inventory at 268.

Figure 7:
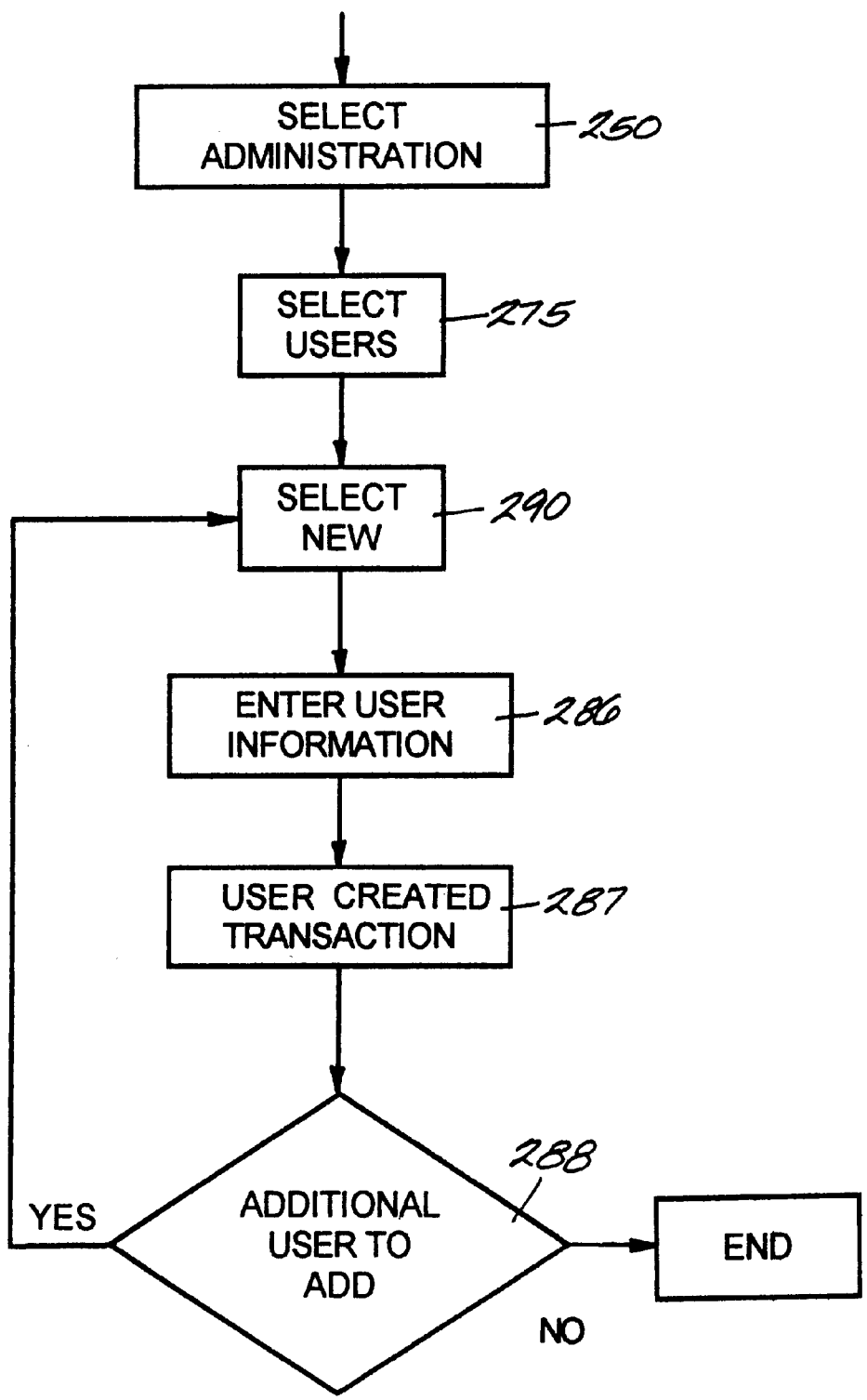
FIG. 7 is a flow chart showing the methodology used to add authorized users to the system implemented in accordance with the teachings of the present invention.

The special order option 245 permits a user to connect at 270 with a supply vendor's e-commerce site. The administration option 250 permits modification of the users 275, products 277, areas 280, and billing codes (or departments) 282 maintained by the system and the generation of reports 284. The functionality supported by the site 157 to add new users is illustrated in detail in FIG. 7. A selection 285 to enter a new user is made, and new user information is entered at 286. Once all the desired information is entered, it is saved and a "user created" transaction 287 is automatically generated and queued for transfer by the communications server 130 to each cabinet 110. The user is then queried at 288 whether additional new users are to be added, and if so, steps 290, 286, and 287 are repeated.

Figure 8:
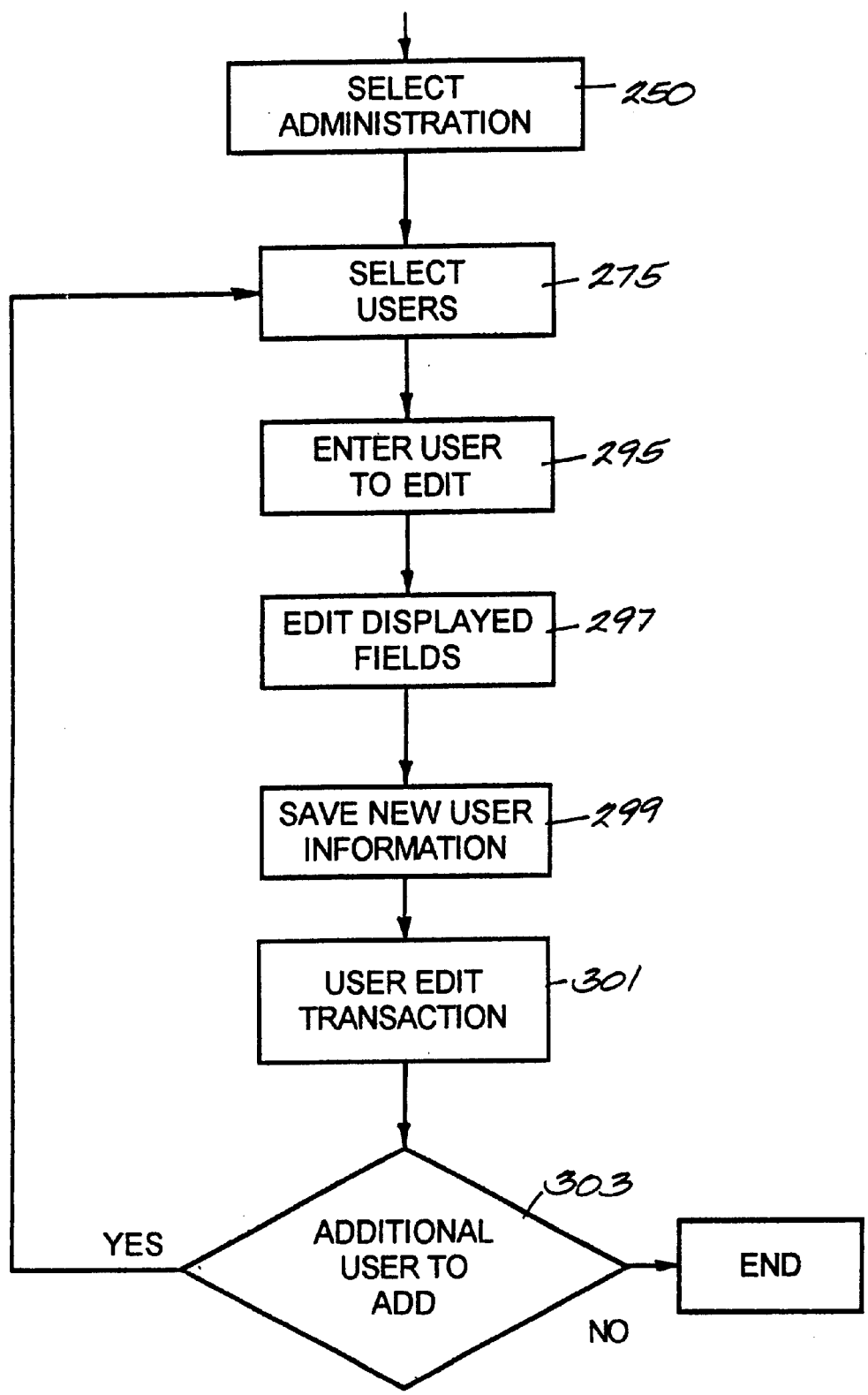
FIG. 8 is a flow chart showing the methodology used to edit user information in a system implemented in accordance with the teachings of the present invention.

User information may be searched by selecting a search engine option 285. An edit option 295 (FIGS. 4 and 8) may be used to edit user information. User information is displayed and edited at 297 and saved at 299. Similar to the addition of a new user, a "user edit" transaction 301 is created and queued for transfer by the communications server 130 to each cabinet 110. The user is then queried at 303 whether additional edits are to be made. If so, the process is repeated.

Figure 9:
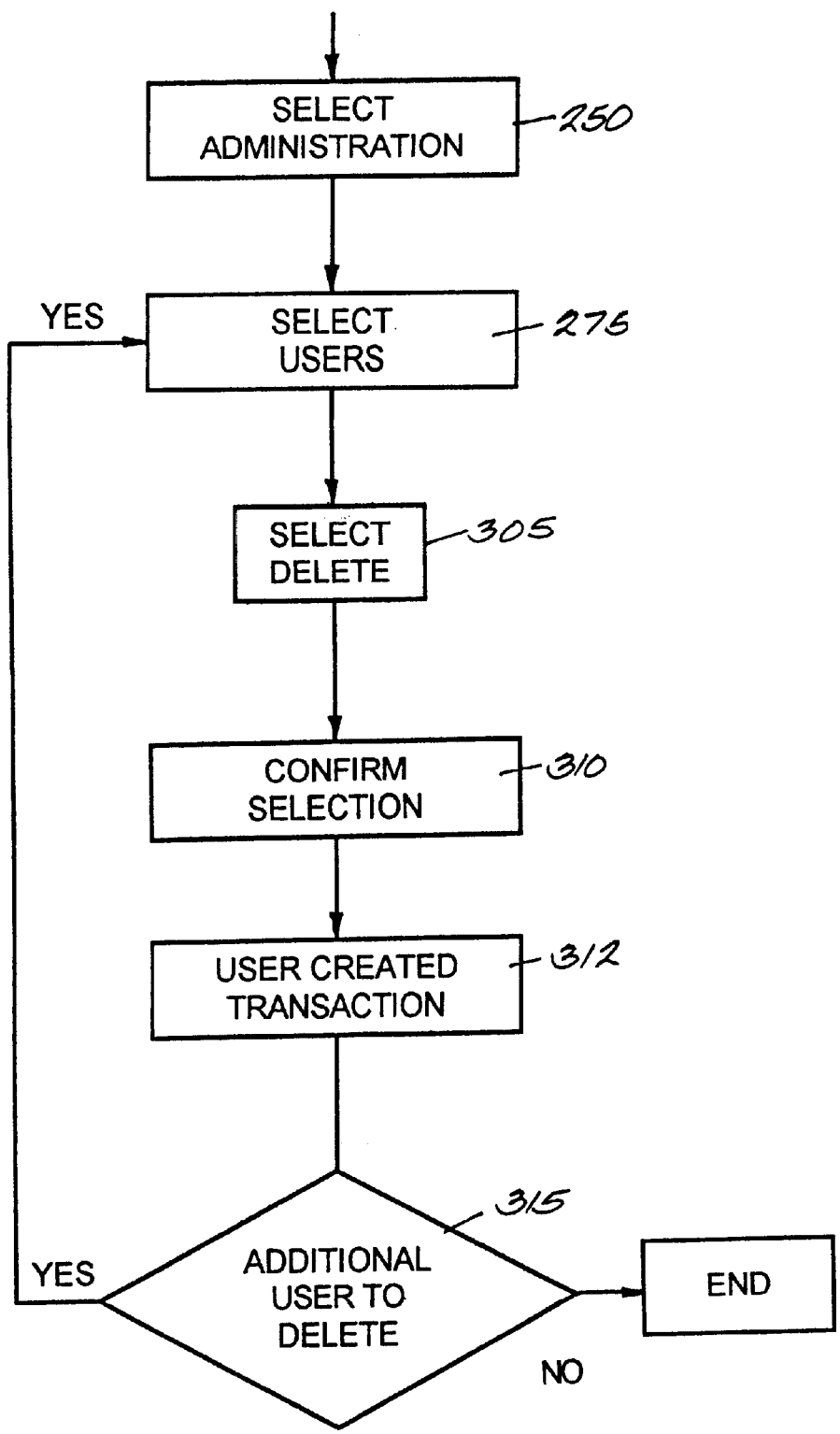
FIG. 9 is a flowchart showing the methodology used to delete user information in a system implemented in accordance with the teachings of the present invention.

User information may be deleted, by selecting a delete option 305 (FIGS. 4 and 9). A selection is made to delete a user and that selection is confirmed at 310. A "user delete" transaction 312 is created and queued for transfer by the communications server to each cabinet 110. The user is queried at 315 whether additional users are to be deleted. If so, the process is repeated.

Figure 10:
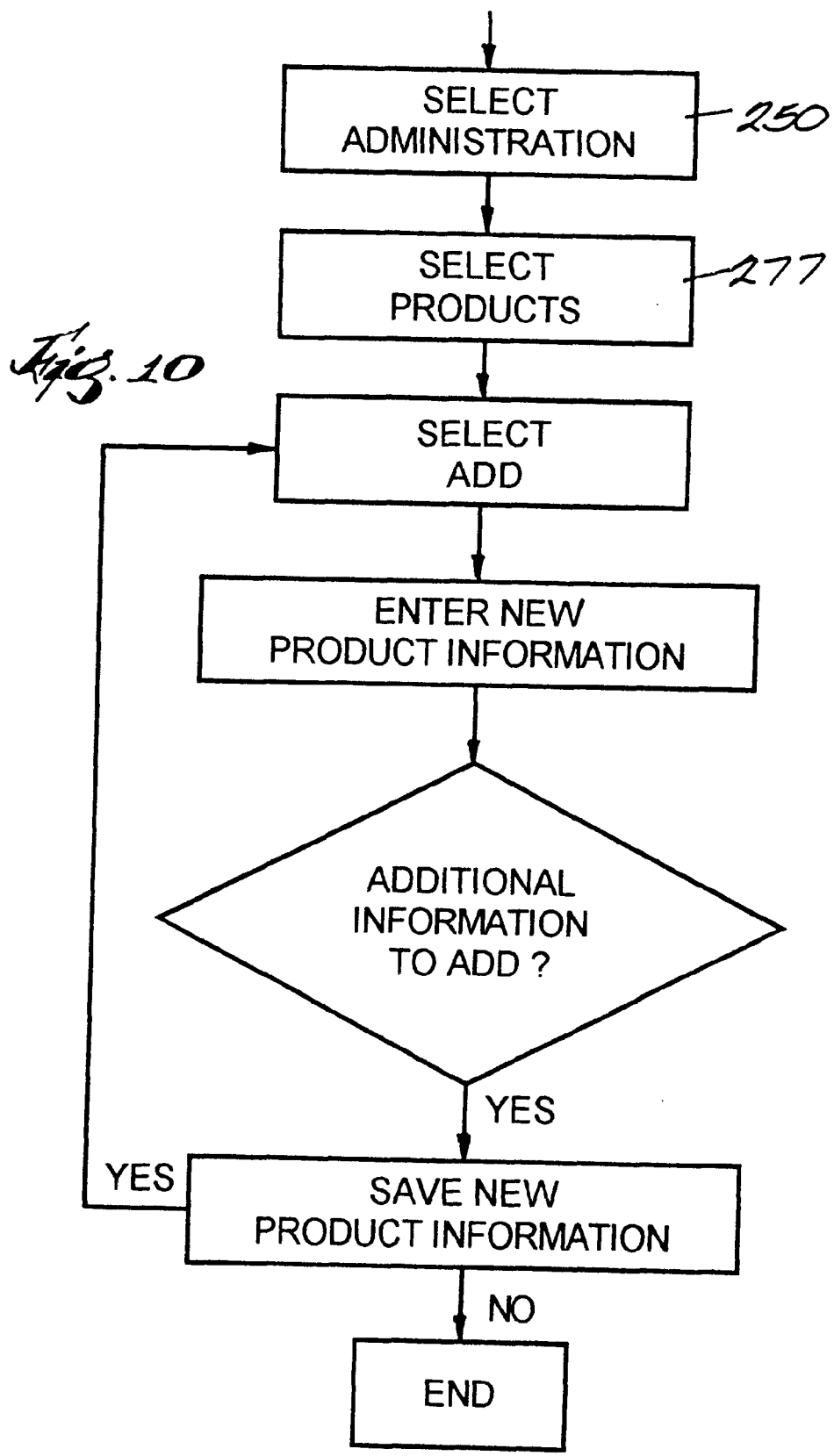
FIG. 10 is a flowchart of the methodology used to enter new product information in a system implemented in accordance with the teachings of the present invention.
Figure 12:
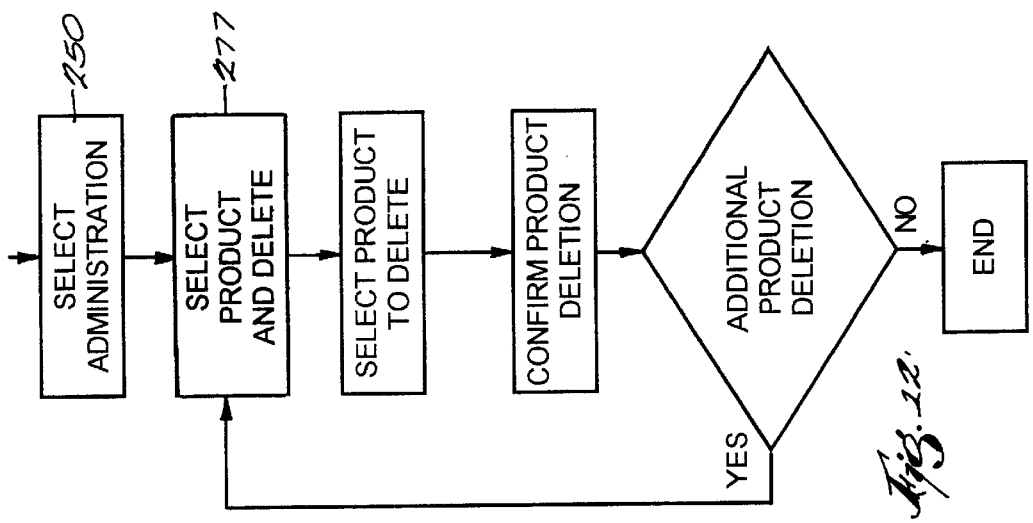
FIG. 12 is a flow chart of the methodology used to delete product information in a system implemented in accordance with the teachings of the present invention.
Figure 11:
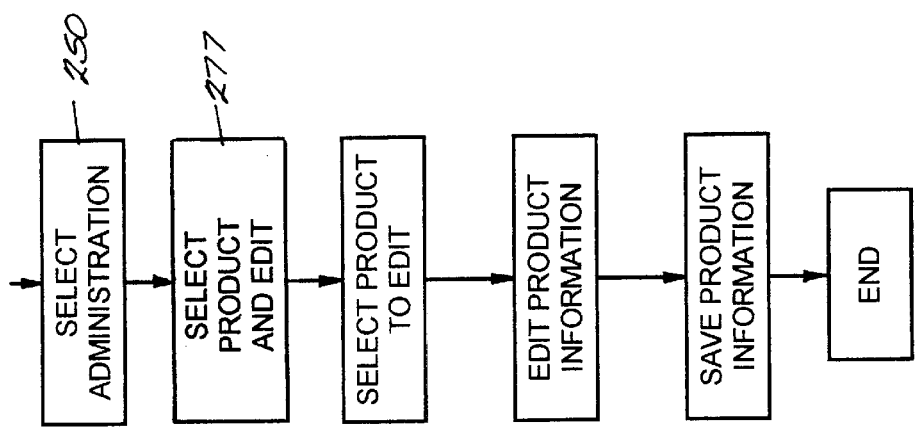
FIG. 11 is a flow chart of the methodology used to edit product information in a system implemented in accordance with the teachings of the present invention.

The web site 157 provides functionality for searching, adding, editing, and deleting product information, area information, and billing code information that is similar to that provided with respect to manipulating user information. The functionality for manipulating product information is illustrated in the flow charts in FIGS. 10–12, but because of the similarity to other processes will not be discussed in detail herein. The functionality, for manipulating area 280 and billing code 282 information should be readily apparent to those of ordinary skill in the art from the drawings and description provided herein. Area information relates to a geographical, functional, or other grouping of cabinets. As its name implies, billing code information relates to the billing system used in a particular application of the invention.

To support the distribution of information collected and recorded by the system 100, numerous reports 284 may be generated through the web site 157. A report menu 284 (FIG. 4) supports report generation functionality. As best seen in FIG. 13, a user report may be generated by selecting a user report option 330, entering a department name or identification at 332, and selecting a desired user from the department at 334. The report is then output for viewing at 336.

As shown in FIG. 14, a consumption report may be generated by selecting a consumption report option 340, entering a department or user identification at 342, and selecting a date range and sort option at 344. The report is then output for viewing at 346. As shown in FIGS. 4 and 15, discrepancy, inventory, and consumption-snapshot reports may also be generated through options 350, 355, and 360 respectively. The details of generating each report are similar to those already discussed and, therefore, will not be discussed in detail.

An additional feature of the report generation described above provided by the invention relates to automating the creation and delivery of reports. An automated reporter 370 (FIGS. 1 and 15A) may be provided in the communications server 130 and accessed by the user through a browser. The automated reporter 370 queries a user for certain report related data or report attributes 372. The attributes include title, page layout, SQL (Structured Query Language) query, column attributes such as data or amounts to be totaled, and data grouped, e-mail address, start date and time for generating a report, the frequency of the report, and the period during which the report should be generated. The user provided data is saved as a "report request record" in a report query table 373. A polling agent 374 polls the table 373 on an ongoing basis. If a record is found that specifies an elapsed report date and time, the automated reporter 370 executes the SQL query, streams the results of the query into a spreadsheet file, and e-mails the file to the designated e-mail address.

As can be seen from the above, the web server 140 and web site 157 enable decentralized users to configure and maintain data in a cabinet 110. This eliminates the requirement, common in prior systems, that the user be physically proximate to a desired cabinet or the main computer and memory that processes and stores information for the subject dispensing system.

Figure 16:
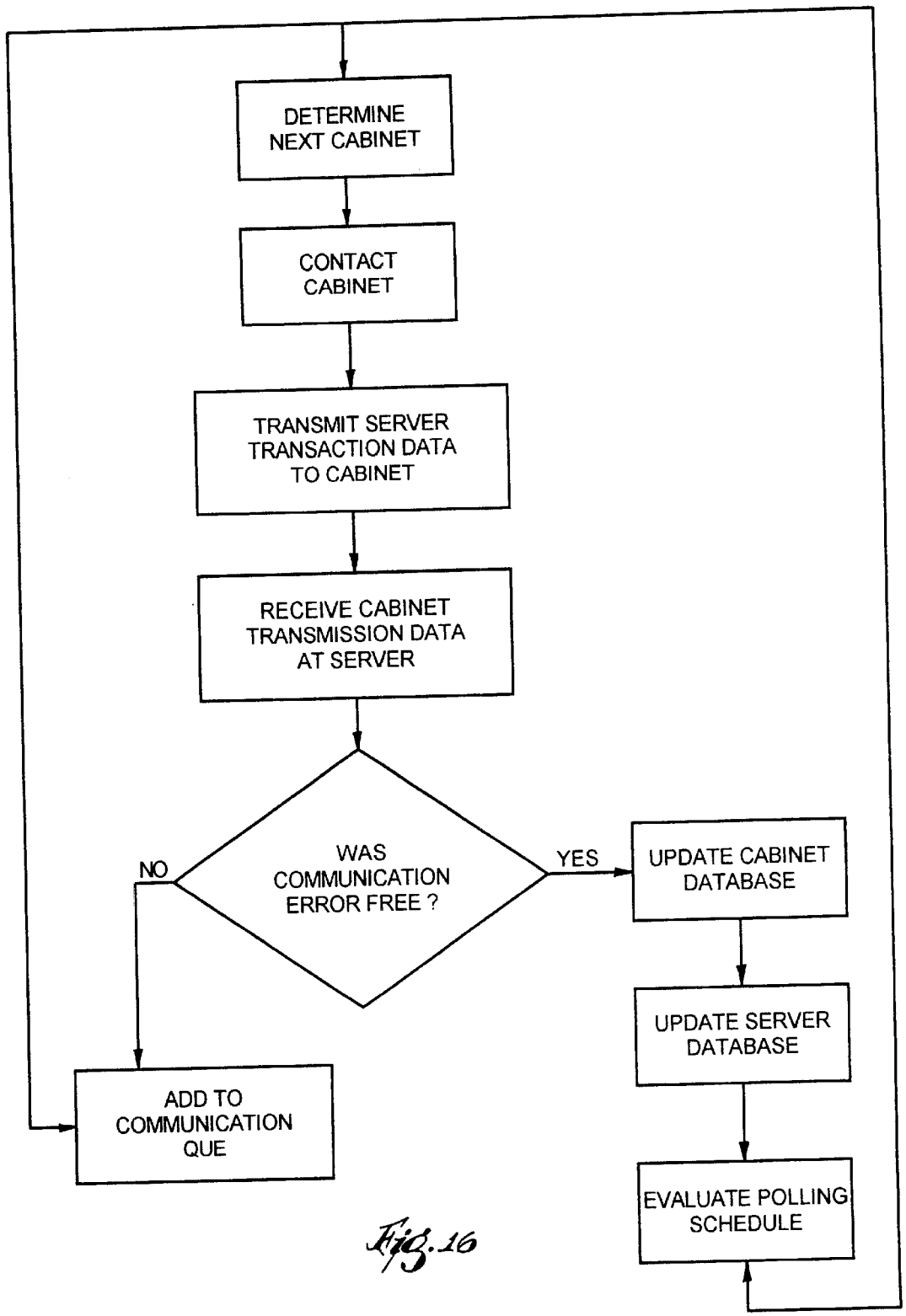
FIG. 16 is a flow chart of the methodology used to poll cabinets in a system made in accordance with the teachings of the present invention.

As noted above, the communications server 130 works in conjunction with the web server 140, providing a variety of tracking, ordering, and communication services. One job of the communications server 130 is to gather information from each cabinet 110. The communications server 130 also maintains up-to-date information for each cabinet 110. In order to accomplish this, a reorder agent 375 of the communications server 130 periodically polls each cabinet 110. The frequency of the polling will depend on the configured polling time or polling frequency of each cabinet 110. For example, a cabinet 110 can be configured to be contacted daily, for example, every day at 3 pm. Alternately, the cabinet can be configured to be contacted more often, for example, every 60 minutes. The data polling process is outlined below in Table 1, and shown in FIG. 16.

TABLE 1

Communications Server 130 Polling Process

1. Server checks the communications queue to determine the next available cabinet to contact.
2. Server contacts cabinet via Internet (TCP/IP) or dial-up modem.
3. Server sends transaction information to the cabinet for all activities that occurred on the server since to the last contact.
4. Server receives transaction information from the cabinet for all activities that occurred at the cabinet since to the last contact.
5. If communications are successful and error-free, the cabinet is removed from the communications queue. Otherwise, the cabinet is "demoted" to the bottom of the queue to allow for re-transmission after other cabinets have transmitted.
6. The cabinet updates internal databases with new transaction information. Data includes new and modified users, products, billing codes, and cabinet system configuration.
7. Server updates the database 155 with new transaction information. Data includes item withdrawals, returns, inventory restocks, and manual cabinet reconfiguration.
8. Server evaluates cabinet polling times and adds cabinets to the queue as necessary based on the current time of day.
9. Process is repeated by returning to step 1.

Figure 17:
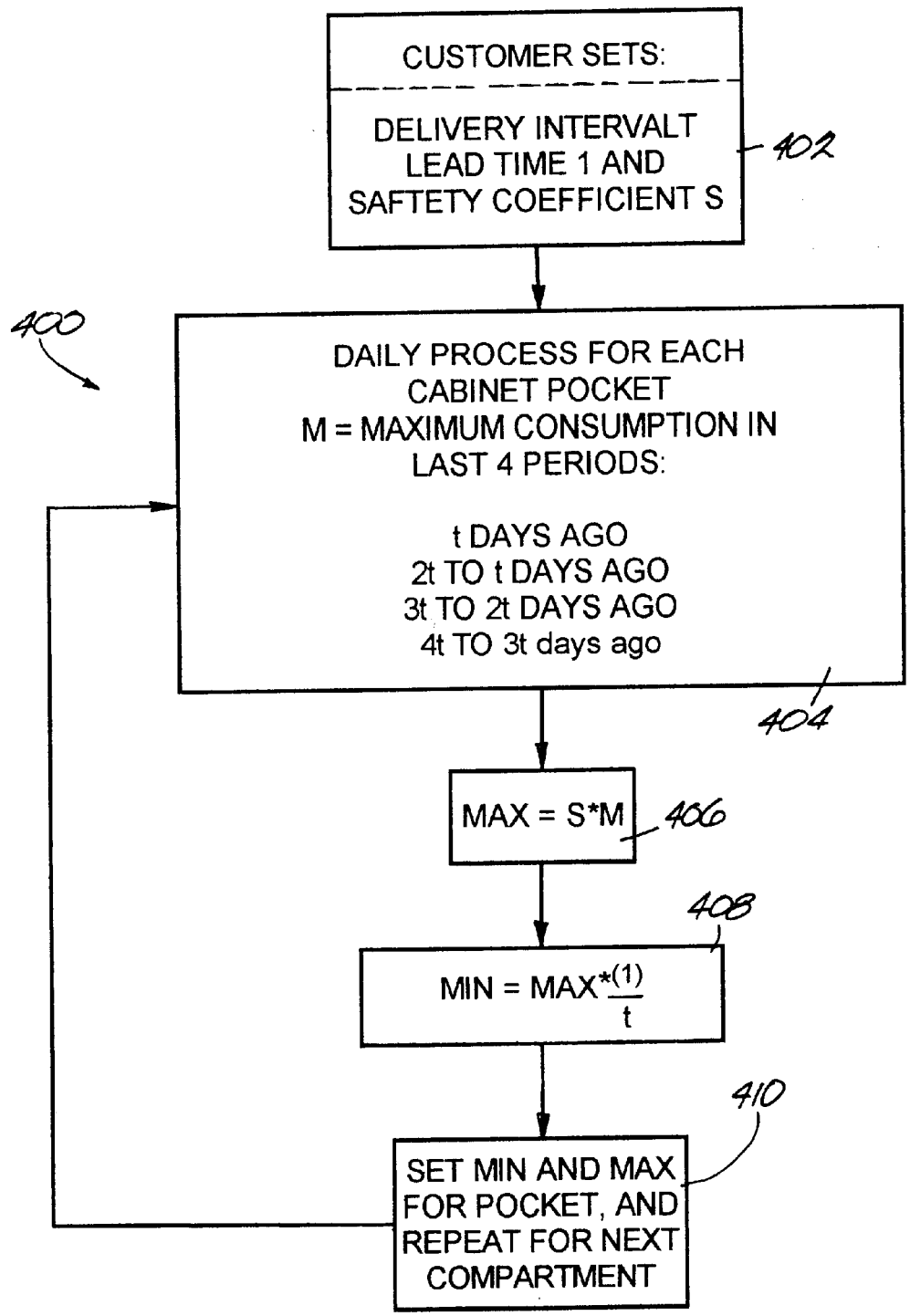
FIG. 17 is a flow chart of the methodology used to set the minimum and maximum inventory levels for components in a system made in accordance with the teachings of the present invention.

Another feature of the present invention is dynamic par leveling. This aspect of the present invention is illustrated in FIG. 17. In order to maximize efficiency in the system 100, a minimum inventory level MIN and a maximum inventory level MAX for each compartment 115 in one each cabinet 110 is set in a par-leveler 400 of the portal site 152. In this way, supplies are timely reordered to avoid running out of articles. Overstocking is also prevented.

The par-leveler 400 receives input data at 402. The data includes a delivery interval t, a lead time I, and a safety coefficient S. The maximum consumption for articles in each compartment 115 of a cabinet during the last four time intervals is determined at 404. That is, the consumption during the time periods t days ago, 2t to t days ago, 3t to 2t days ago, and 4t to 3t days ago is monitored and the largest or maximum consumption M of the time periods is determined. This process is conducted daily to maintain an up-to-date maximum M. Once M is calculated for the particular day at hand, the maximum order amount MAX is determined at 406. MAX is equal to M times a safety multiplier or coefficient S. In this way, the system determines an order amount, based on consumption, that should never be exceeded.

The minimum order amount, MIN, is calculated from the MAX value at 408. MIN is equal to MAX times the lead time I divided by the delivery interval. The MIN for any compartment is the re-order point because letting the article level fall below the MIN amount will result in an out-of-stock situation. Once MAX and MIN have been established for one compartment, the process is continued until all MAX and MIN values for all the compartments have been determined, as shown at 410. As an alternative to the algorithm implemented by the par-leveler 400, the MAX and MIN may be set by a user to a user determined level.

Figure 18A:
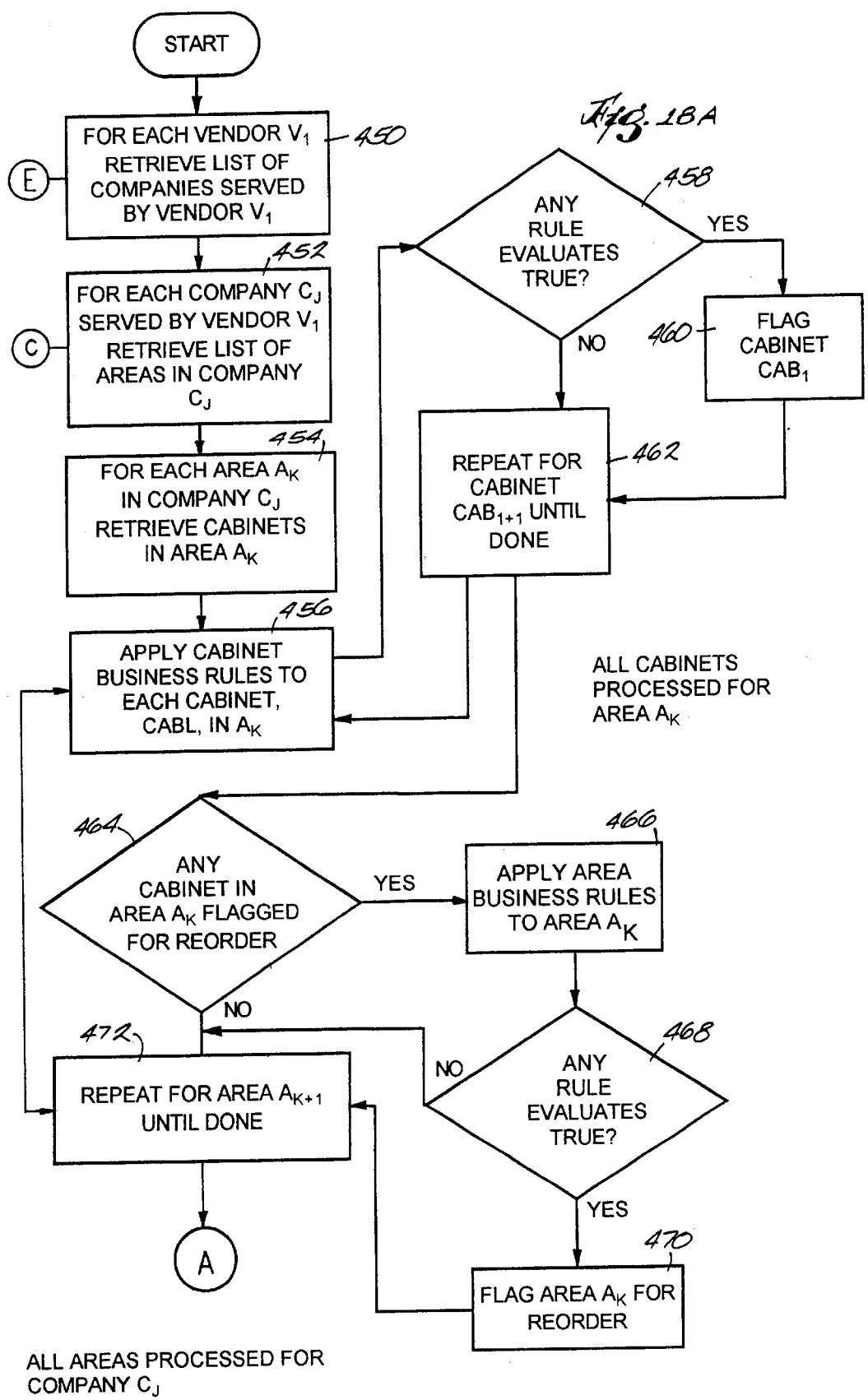
FIG. 18A is a flow chart of a part of the process used to generate an order in a system made in accordance with the teachings of the present invention.
Figure 16B:
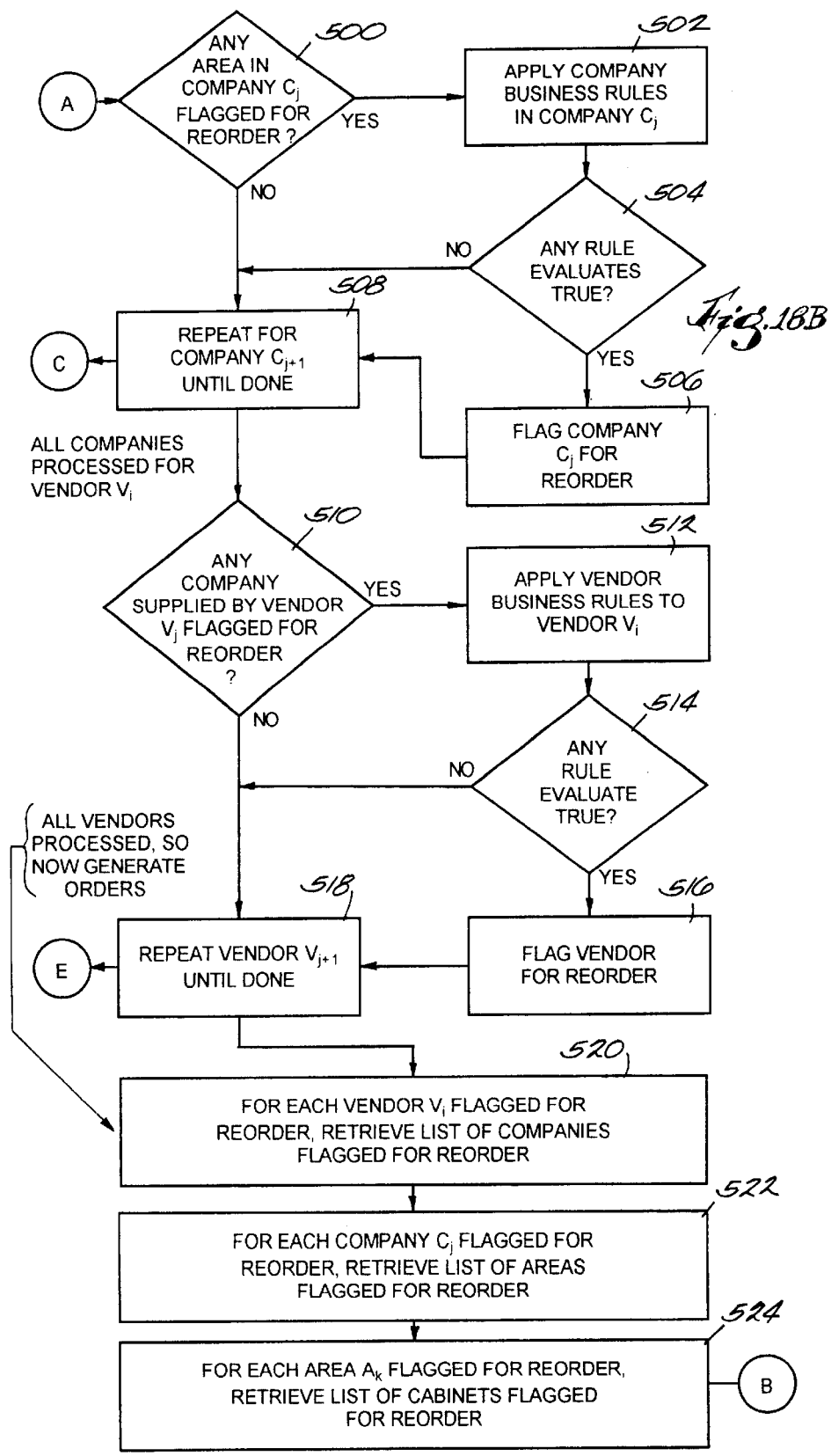
Figure 18C:
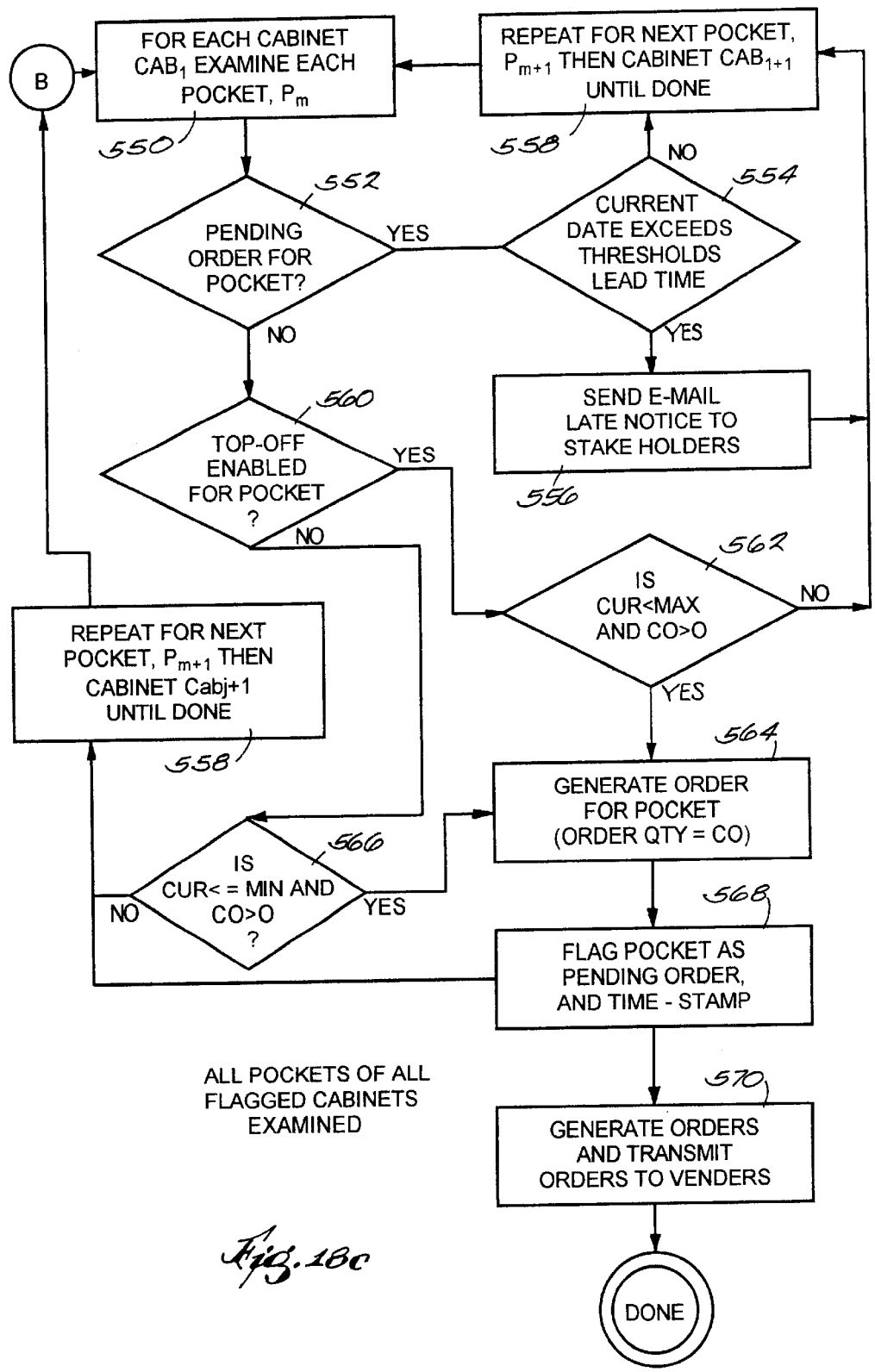
FIG. 18C is a flow chart of yet another part of the process used to generate an order in a system made in accordance with the teachings of the present invention.

Once the MIN and MAX values have been determined (whether by the user or through the par leveler 400) for each compartment 115 in each cabinet 110, a set of business rules may be applied to automatically generate appropriate orders and deliver those orders to vendors. The process is shown in FIGS. 18A–18C. The process starts in FIG. 18A, at 450, where for each vendor, a list of companies served by that vendor is retrieved. Then at 452, for each company served by that vendor, a list of areas for the company is retrieved. An area may be a geographical grouping of one or more cabinets or it may be a grouping of cabinets based on functional or other characteristics. At 454, a list of cabinets for each area in a company is retrieved. Then, the business rules shown in Table 2 are applied at 456.

TABLE 2

Cabinet Level Rules (can be grouped with boolean AND, OR)

1. At least x high priority items in cabinet are below MIN
2. At least x high priority items in cabinet are out of stock
3. At least x normal priority items in cabinet are below MIN
4. At least x normal priority items in cabinet are out of stock
5. At least x low priority items in cabinets are below MIN
6. At least x low priority items in cabinet are out of stock
7. Dollar value of items ordered (if cabinet was to be restocked) exceeds x
8. Current day of the week is x (Sunday, Monday, etc.)
9. Current day of the month is x (1–31)

As shown at 458, the rules are reviewed to determine if any of them evaluate to true. If so, the particular cabinet is flagged at 460 as being eligible for re-ordering. The process is repeated as shown at 462, until all the cabinets in the area have been reviewed. Depending on the particular application at hand, the cabinet level rules can be grouped together by boolean operators to create compound rules. This is also true of the other rules discussed below. Once all the cabinets have been processed, a determination at 464 is made as to whether any cabinet in the area has been flagged for re-order. If so, then the area business rules of Table 3 are applied, as shown at 466.

TABLE 3

Area Level Rules (can be grouped with boolean AND, OR)

1. At least x high priority items in area are below MIN
2. At least x high priority items in area are out of stock
3. At least x normal priority items in area are below MIN
4. At least x normal priority items in area are out of stock
5. At least x low priority items in area are below MIN
6. At least x low priority items in area are out of stock
7. Dollar value of items ordered (if area was to be restocked) exceeds x
8. Current day of the week is x (Sunday, Monday, etc.)
9. Current day of the month is x (1–31)

If any of the area business rules evaluate as true (as shown at 468), then the area is flagged for re-order at 470. As shown at 472, the process is repeated until all areas of the company have been analyzed.

Once all the areas in the company have been reviewed, a determination at 500 (FIG. 18B) is made as to whether any area in one company has been flagged for re-order. If an area has been flagged, the company business rules of Table 4 are applied for the company being processed at 502.

TABLE 4

Company Level Rules (can be grouped with boolean AND, OR)

1. At least x high priority items in company are below MIN
2. At least x high priority items in company are out of stock
3. At least x normal priority items in company are below MIN
4. At least x normal priority items in company are out of stock
5. At least x low priority items in company are below MIN
6. At least x low priority items in compnay are out of stock
7. Dollar value of items ordered (if company was to be restocked) exceeds x
8. Current day of the week is x (Sunday, Monday, etc.)
9. Current day of the month is x (1–31)

If any of the company business rules evaluate as true at 504, then the company is flagged for reorder at 506. The process continues until all companies for the vendor have been processed as shown at 508. At 510, a determination is made as to whether any company vendor has been flagged for reorder. If so, the vendor business rules of Table 5 are applied at 512.

TABLE 5

Vendor Level Rules (can be grouped with boolean AND,OR)

1. At least x high priority items in vendor below MIN
2. At least x high priority items in vendor are out of stock
3. At least x normal priority items in vendor are below MIN
4. At least x normal priority items in vendor are out of stock
5. At least x low priority items in vendor are below MIN
6. At least x low priority items in vendor are out of stock
7. Dollar value of items ordered (if vendor was to be restocked) exceeds x
8. Current day of the week is x (Sunday, Monday, etc.)
9. Current day of the month is x (1–31)

If any of the vendor business rules evaluate as true at 514, then the vendor is flagged for re-order at 516. The process is repeated, as shown at 518, until all vendors have been processed. Once all the vendors are processed, orders are generated. As shown at 520, for each vendor flagged for re-order, a list of companies flagged for reorder is retrieved. Then, at 522, the list of areas flagged for reorder for each company is retrieved. At 524, a list of cabinets flagged for re-order is retrieved for each area flagged for reorder.

Each compartment for each cabinet is examined at 550 (FIG. 18C). A determination is made at 552 as to whether an order for a compartment is pending. If so, the current date is checked at 554 against the lead time needed to deliver an order. If the date is past the lead-time needed, a late notice is sent to the company expecting the order, as shown at 556. Whether or not a late notice is required, the examination of compartments continues as shown at 558 until all compartments in all cabinets have been reviewed. If there is no order pending for a compartment, the system (web server) then checks to see whether an order sufficient to fill or top-off the compartment should be issued. At 560, the system checks to see whether the top-off function is enabled. If it is, then a current inventory, CUR, is compared to the MAX value and a convenience order value CO is checked at 562. If the current value CUR is at the MAX value or the CO value is not greater that zero, then the next compartment is examined. If the CUR value is less that the MAX value and the CO value is greater than zero, an order for the CO value is generated at 564. If the top off function is not enabled, the CUR value is checked against the MIN value at 566. If the CUR value is less than or equal to the MIN value and the CO value is greater than zero, an order for the CO amount is generated at 564. If not, the next compartment is checked. If an order is generated, the compartment is flagged as having an order pending and time-stamped at 568. Once all the compartments are examined, orders are generated and transmitted to vendors at 570.

In the process described above, the convenience order concept was introduced. The system of the present invention optimizes ordering of supplies by ensuring that re-orders are made in quantities that not only prevent overstock or out-of-stock situations, but also optimize delivery of items in standard quantities and package sizes that correspond to the quantities and sizes that manufacturers normally produce. This may be more clearly seen by reference to Table 6.

automatic re-orders or replenishment of dispensed items when inventory reaches a certain predetermined level.

The foregoing detailed description describes only a few of the many forms that the present invention can take, and should therefore be taken as illustrative rather than limiting. It is only the following claims, including all equivalents, that are intended to define the scope of the invention.

What is claimed is:

1. A method of doing business, wherein a third-party company facilitates the supply of articles from vendor companies to consumer companies, the third-party company performing the steps comprising:

supplying cabinets to multiple consumer companies, the multiple consumer companies storing articles within the cabinets;

TABLE 6

Re-order Methodology

| Term | Definition | Example |
| --- | --- | --- |
| Unit of Issue (UI) | Description of packaging for each unit dispensed from. cabinet | "Disk", "1 Folder", "3-pack", "Box", etc. |
| Unit of Purchase(UP) | Description of packaging for each unit purchased from supplier/manufacturer | "Disk", "Dozen", "Box", "3-pack", etc. |
| Quantity Issued Per Unit of Purchase (QIPUP) | Number of units dispensed from cabinet for each UP. | If file folders are dispensed individually, but purchased by the box (100/box), then the QIPUP = 100 |
| Convenience Multiple (CM) | UP multiple preferred by the supplier | If supplier sell pens individually (UP = "Each") but pens come packaged in boxes of 12, then the CM = 12, since the vendor prefers not to break packages. |
| CUR | The current quantity of an item, (based on UI) | If there are 12 pens in the cabinet, CUR = 12 |
| MAX | Maximum quantity (based on UI) | If the cabine pocket holds 60 pens, and pens are dispensed individually, then MAX = 60 |
| MIN | The mininium quantity (based on UI) of a given item that may be maintained in the cabinet witbout generating a restock order for the item (i.e., the reorder point) | If MIN = 12, then an order will be generated when CUR < 12 |
| Optimal Order (OO)<br><br>OO = INT {MAX-CUR} | The maximum reorder. quantity possible (based on UP) without exceeding MAX. then OO = 50. Note that OO QIPUP | Using the pen example, if MAX = 60, MIN = 12, and CUR = 10, AND QIPUP = 1,<br><br>disregards the convenience multiple. |
| Convenience Order (CO) | Same as OO, but includes. CM. This results in more "supplier friendly" orders, since packages need not be broken down by the supplier prior to delivery.<br>CO = INT {OO}*CM<br>CM | If the CM = 12 in the above example (i.e., pens sold individually, but packaged in boxes of 12), then CO = 48. Using CO for a restock order ensures that the supplier will not have to break packages. |

In the example shown in Table 6, the convenience order value CO is defined based on the vending activity that occurs from a compartment 115 in a cabinet 110. However, it also considers the quantity of articles or items present in standard packages and results in orders that generally do not require vendors to provide partial purchase amounts.

As can be seen from the above, the present invention provides a method and system for controlling the dispensing of items from enclosures. The method and system provide enhanced information about the inventory and users who access the system. Further, the method and system provide establishing a third-party server located at the third-party company;

receiving inventory information on the third-party server regarding the articles contained within each of the cabinets;

analyzing the inventory information at the third-party server; and placing orders through the third-party server with at least one of the vendor companies for replacement articles based on analyzing the inventory information, the replacement articles to be supplied directly to the cabinets at the consumer companies by the vendor.

2. The method of claim 1, wherein access to the articles stored within the cabinets is governed by a controller computer.

3. The method of claim 2, wherein the inventory information is compiled by the controller computer.

4. The method of claims 3, wherein the inventory information is received by the third-party server from the controller computer via one of a network or modem.

5. The method of claim 4, wherein the network includes the Internet.

6. The method of claim 4, wherein access to the third-party server can be gained via a network.

7. The method of claim 4, wherein the inventory information received on the third-party server can be accessed by any computer connected to the Internet.

8. A method of doing business, wherein a third-party company facilitates the supply of articles from vendor companies to consumer companies, the third-party company performing the steps comprising:
receiving inventory information from cabinets located in at least one of the consumer companies regarding articles contained within the cabinets,
compiling the inventory information for all cabinets in a third-party server,
using the third-party server to analyze the inventory information to assess inventory levels in each of the cabinets, and to place orders with at least one of the vendor companies the vendor companies supply replacement articles directly to the cabinets located in the consumer companies based on analyzing the inventory information.

9. The method of claim 8, wherein each cabinet is secured and has a controller computer associated with it, the controller computer governing access to the cabinet.

10. The method of claim 9, wherein the inventory information is communicated from the controller computer to the third-party server.

11. The method of claim 10, wherein the inventory information is communicated via the Internet.

12. The method of claim 9, wherein the third-party server places the orders with the vendor companies based on preset ordering rules programmed into the third-party server.

13. The method of claim 12, wherein the orders are placed over a network.

14. A method of doing business, wherein a third-party company facilitates the supply of articles from a vendor company to a consumer company, the third-party company supporting a third-party server and performing the steps comprising:
supplying a cabinet to a consumer company, the consumer company being remote from the third-party server and storing articles within the cabinet the cabinet including a controller which compiles up-to-date inventory information regarding the articles contained within the cabinet, the third-party server periodically polling the controller to retrieve inventory information from the controller,
analyzing the inventory information at the third-party server, and
placing an order through the third-party server with a vendor company to supply replacement articles to the cabinet located in the consumer company based on analyzing the inventory information.

15. The method of claim 14, wherein the inventory information communicated from the cabinets to the third-party server includes information regarding the number and type of articles within the cabinet.

16. The method of claim 14, wherein the inventory information is communicated from the controller to the third-party server via a public network.

17. The method of claim 16, wherein the public network includes the Internet.

18. The method of claim 14, wherein the orders are placed via a public network and the vendors can access the inventory information via the third-party server.

19. The method of claim 18, wherein the vendor accesses the third-party server via the Internet.

20. A method of doing business, wherein a third-party company facilitates the supply of articles from a vendor company to a consumer company, the third-party company supporting a third-party server and performing the steps comprising:
supplying a cabinet to a consumer company, the consumer company storing articles within the cabinet,
receiving inventory information on the third-party server via a public network regarding the articles contained within the cabinet,
analyzing the inventory information at the third-party server, and
placing orders through the third-party server with a vendor company via a public network for replacement articles based on analyzing the inventory information, the replacement articles to be supplied directly to the cabinet at the consumer company by the vendor.

21. The method of claim 20, wherein the public network includes the Internet.

22. The method of claim 21, wherein the inventory information is stored on the third-party server at the third-party company and the inventory information can be accessed by logging onto the third-party server through the Internet.

23. The method of claim 22, wherein a link is established via the Internet between a remote computer and the third-party server, the remote computer sending to the third-party server via the link a specific inquiry regarding the availability of a particular article in the cabinet.

24. The method of claim 22, wherein a link is established via the Internet between a remote computer and the third-party server, the third-party server governing access to the inventory information by a user of the remote computer and directing the user to the location of a particular article identified by the user.

25. The method of claim 20, wherein order information recording the orders placed with the vendor company is tracked on the third-party server at the third-party company and is accessed by the vendor company via the Internet.

26. The method of claim 20, wherein multiple cabinets are supplied to multiple consumer companies, the third-party server at the third-party company receives and analyzes inventory information regarding the articles contained within each of the cabinets, and the third-party server places orders with multiple vendor companies based on the analysis of the inventory information received from each of the cabinets at the multiple consumer companies.

27. The method of claim 20, wherein the cabinet includes at least one lockable compartment.

28. A method of doing business, wherein a third-party company facilitates the supply of articles from a vendor company to a consumer company, the third-party company performing the steps comprising:
establishing a third-party server at the third-party company,
storing on the third-party server packaging information regarding the number of a particular article packed by the vendor company within a package of the particular article, supplying a cabinet to a consumer company, the consumer company storing the particular article within the cabinet, receiving inventory information at the third-party server via a public network regarding the number of the particular article contained within the cabinet, analyzing the inventory information at the third-party server, and placing orders through the third-party server with a vendor company via a public network for packages of the particular article based on analyzing the inventory information and the packaging information, the packages of the particular article to be supplied directly to the cabinet at the consumer company by the vendor.

29. The method of claim 28, wherein the analysis of the inventory information at the third-party server includes tracking the consumption of the particular article over a period of time.

30. The method of claim 29, further comprising determining the maximum amount of the article to be ordered based on the consumption of the particular article over a period of time.

31. The method of claim 30, wherein the consumption of the article over a period of time is measured according to a delivery interval and the maximum amount of the article ordered is determined using a safety multiplier.

32. The method of claim 31, further comprising determining the minimum amount of the article to be ordered based on the maximum amount of the article to be ordered, a lead time, and the delivery interval.

* * * * *